UNITED STATES PATENT OFFICE.

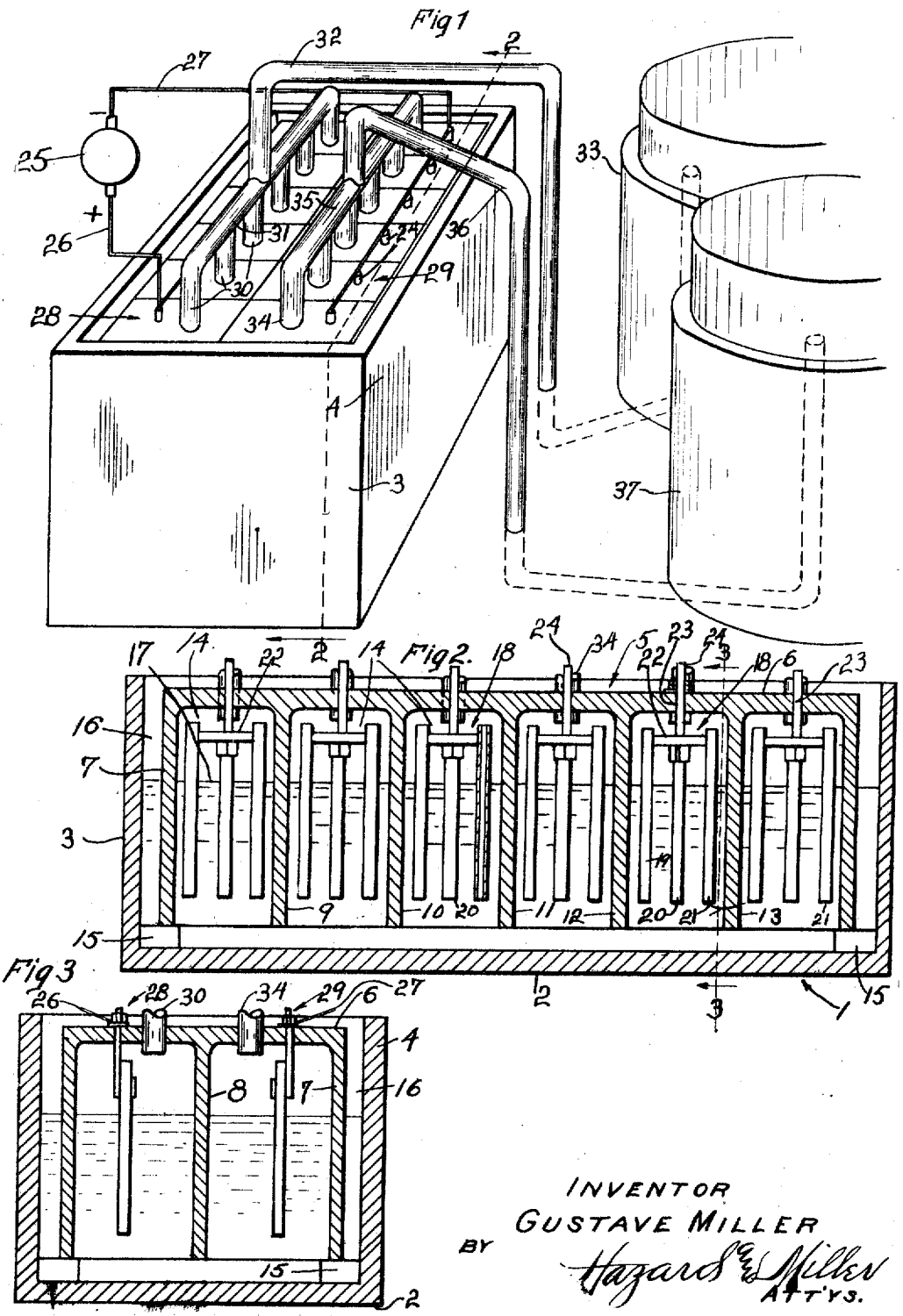

GUSTAVE MILLER, OF LOS ANGELES, CALIFORNIA.

OXYGEN AND HYDROGEN GENERATOR.

1,334,668.  Specification of Letters Patent.  Patented Mar. 23, 1920.

Application filed June 17, 1919. Serial No. 304,942.

*To all whom it may concern:*

Be it known that I, GUSTAVE MILLER, a citizen of the United States, residing at Los Angeles, in the county of Los Angeles and State of California, have invented new and useful Improvements in Oxygen and Hydrogen Generators, of which the following is a specification.

My object is to make an improved oxygen and hydrogen generator, and my invention consists of the novel features herein shown, described and claimed.

Figure 1 is a perspective of an oxygen and hydrogen generator embodying the principles of my invention.

Fig. 2 is a vertical longitudinal sectional detail on the line 2—2 of Fig. 1 and looking in the direction indicated by the arrows.

Fig. 3 is a vertical cross section on the line 3—3 of Fig. 2.

The container 1 is rectangular in plan and has a flat bottom 2, straight vertical ends 3 and straight vertical sides 4, and the container is made preferably of porcelain, clay, stone, glass, or the like so as to be acid proof and a non-conductor of electricity.

The cell member 5 is likewise made of porcelain, clay, stone, glass, or the like so as to be acid proof and a non-conductor of electricity, and the cell member comprises a flat top 6, outer walls 7 extending downwardly from the edges of the flat top, a longitudinal partition wall 8 extending downwardly from the transverse center, and cross partitions 9, 10, 11, 12 and 13, thereby producing a plurality of cell chambers 14. The cell member 5 is smaller in plan than the container 1. Supporting blocks 15 are placed in the corners of the container and the cell member 5 is inserted downwardly into the container and rests upon the blocks 15, there being a space 16 all the way around between the container and the cell member.

Water is made slightly alkaline with sodium hydrate and placed in the container 1, so that when the cell member 5 is inserted the water level 17 will be substantially three-quarters of a distance up from the bottom 2 to the tops of the cell chambers 14.

An electrode 18 is placed in each cell chamber, and each electrode preferably comprises open ended copper pipes 19, 20 and 21. The pipes are connected at their upper ends by a crossbar 22, and the stem 23 is connected to the crossbar and inserted upwardly through the top 6 so as to suspend the electrode in the chamber 14. A binding post construction 24 is formed upon the upper end of the stem 23. The generator 25 is connected one way by the positive line 26 and the other way by the negative line 27.

The row 28 of electrodes 18 on one side of the partition 8 is connected together and the positive line 26 is connected to this row. The row 29 of electrodes on the other side of the partition 8 is connected together and the negative line 27 is connected to this row, so that the electricity must flow from the row 28 to the row 29 and must pass downwardly under the partition 8. The row of cells containing the row of electrodes 29 will produce hydrogen, and the row of cells containing the row of electrodes 28 will produce oxygen.

Pipes 30 extend upwardly through the top 6, one pipe from each cell chamber 14 of the positive row 28. A collecting pipe 31 connects the upper ends of the pipes 30, and the pipe 32 leads from the collecting pipe 31 to the oxygen storage tank 33. In a like manner pipes 34 extend upwardly from the negative row 29 of each cell chamber, a collecting pipe 35 connects the upper ends of the pipes 34, and a pipe 36 connects the pipe 35 to the hydrogen storage tank 37.

In place of sodium hydrate any other suitable electrolyte may be added to the water to produce the proper conductivity, as will be understood. The E. M. F. is preferably three volts.

It is proposed to produce the oxygen and hydrogen for commercial purposes or mechanical uses, and one of the purposes is to compress the oxygen and hydrogen in separate tanks for convenient handling and to run the oxygen and hydrogen through burners similar to the burners used in acetylene welding or the like for various mechanical uses.

The object of the partitions 9, 10, 11, 12 and 13 is to divide the row into individual cells, and the object of the partition 8 is to divide the anode from the cathode portions of the cell so that the oxygen and hydrogen will be kept separate in their generation and collection.

One of the principal features of my invention resides in the provision of the open ended pipes constituting the anodes and cathodes, thus providing a maximum area of the electrodes for the generation of the gases.

Various changes may be made without departing from the spirit of my invention as claimed.

I claim:

1. An oxygen and hydrogen generator comprising a container adapted to hold an electrolytic solution, a cell member made of non-metallic, non-conducting, non-absorbing material having a transverse partition, one end of the cell being open and the other end being closed and adapted to be mounted in the container with its open end opening downwardly, the transverse partition being spaced slightly above the floor of the container, electrodes mounted within the cell chambers adapted to be connected into a proper electric circuit, and a gas conduit leading from each of the cell chambers.

2. An oxygen and hydrogen generator comprising a container adapted to carry an electrolytic solution, a cell member composed of non-metallic, non-conducting, non-absorbing material having a transverse partition dividing the cell into two chambers, one end of the cell being closed, the other end being open and adapted to be mounted in the container with its open end downwardly, means for supporting the cell in the container whereby the partition is spaced somewhat above the floor of the container, open-ended tubular electrodes mounted within each of the cell chambers adapted to be connected into a proper electric circuit and a gas conduit for each of the cell chambers adapted to conduct gas therefrom.

In testimony whereof I have signed my name to this specification.

GUSTAVE MILLER.